(12) United States Patent
Thota et al.

(10) Patent No.: US 9,446,714 B2
(45) Date of Patent: Sep. 20, 2016

(54) SLIDING CONVERSATION MIRROR ASSEMBLY WITH FRICTION TABS FOR VEHICLE OVERHEAD CONSOLE

(71) Applicant: Ford Global Technologies, LLC, Dearborn, MI (US)

(72) Inventors: Bhavani Thota, Sterling Heights, MI (US); Ricardo Juarez Favila, Metepec (MX); Salvador Soriano, San Mateo Atenco (MX); Mark Haradean, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 13/735,546

(22) Filed: Jan. 7, 2013

(65) Prior Publication Data

US 2014/0192430 A1 Jul. 10, 2014

(51) Int. Cl.
*B60R 1/00* (2006.01)
*B60R 1/04* (2006.01)

(52) U.S. Cl.
CPC *B60R 1/008* (2013.01); *B60R 1/04* (2013.01)

(58) Field of Classification Search
CPC .................... B60R 1/04; B60R 2001/1238
USPC ........................................ 359/871, 872, 875
See application file for complete search history.

(56) References Cited

U.S. PATENT DOCUMENTS

| 4,702,506 | A | 10/1987 | Iimura |
| 4,934,802 | A | 6/1990 | Fluharty et al. |
| 5,273,328 | A | 12/1993 | Kurosaki |
| 6,527,329 | B2 * | 3/2003 | Bauer ............... B60J 3/0208 296/97.4 |
| 8,434,812 | B2 * | 5/2013 | Li ...................... B60R 1/008 296/97.5 |
| 2003/0117728 | A1 * | 6/2003 | Hutzel et al. ............. 359/838 |
| 2008/0192370 | A1 * | 8/2008 | Matsumoto .......... B60R 1/008 359/864 |
| 2008/0252090 | A1 | 10/2008 | Tiesler et al. |
| 2010/0301625 | A1 | 12/2010 | Lee |

FOREIGN PATENT DOCUMENTS

KR 20040031437 A 4/2004

OTHER PUBLICATIONS

U.S. Appl. No. 13/735,528, filed Jan. 7, 2013, entitled "Sliding Conversation Mirror Assembly With Magnetic Assist for Vehicle Overhead Console," specification and drawings (20 pages) and filing receipt (3 pages).

Moon, S. and Yi, K., "Design and Vehicle Test of a Vehicle Control Algorithm for Integrated ACC/CA System," ACTA Press, Abstract, from Proceeding (596) Modelling, Identification, and Control, 2008, www.actapress.com, 1 page.

* cited by examiner

*Primary Examiner* — Jennifer L. Doak

(74) *Attorney, Agent, or Firm* — Vichit Chea; Price Heneveld LLP

(57) ABSTRACT

A vehicle overhead console is provided which includes a conversation mirror assembly having a housing capable of storing a conversation mirror. The conversation mirror may travel between a stored and a use position. The conversation mirror is releasably secured to the stored and use positions by way of magnetic, tab, and spring arrangements.

21 Claims, 6 Drawing Sheets

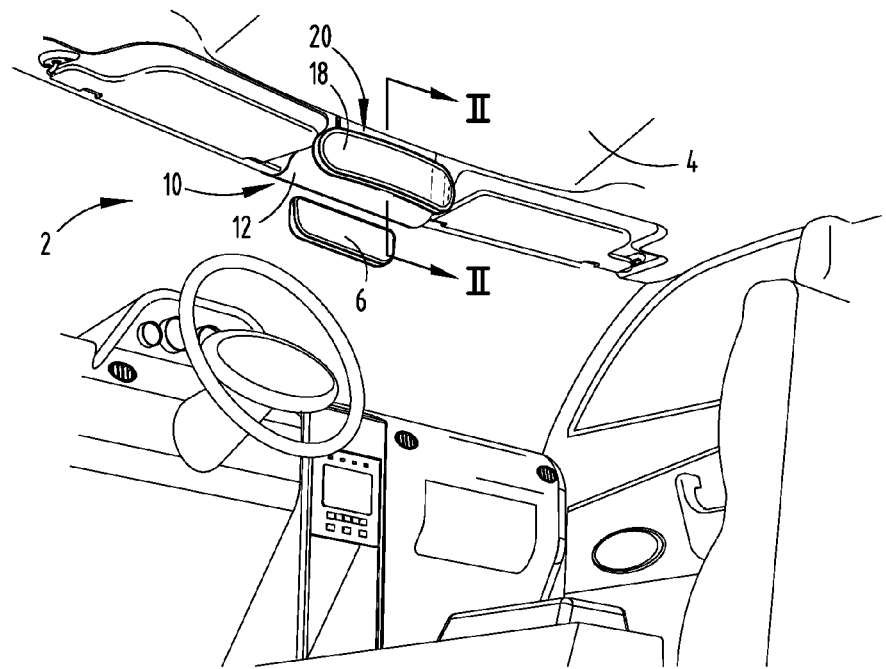
FIG. 1
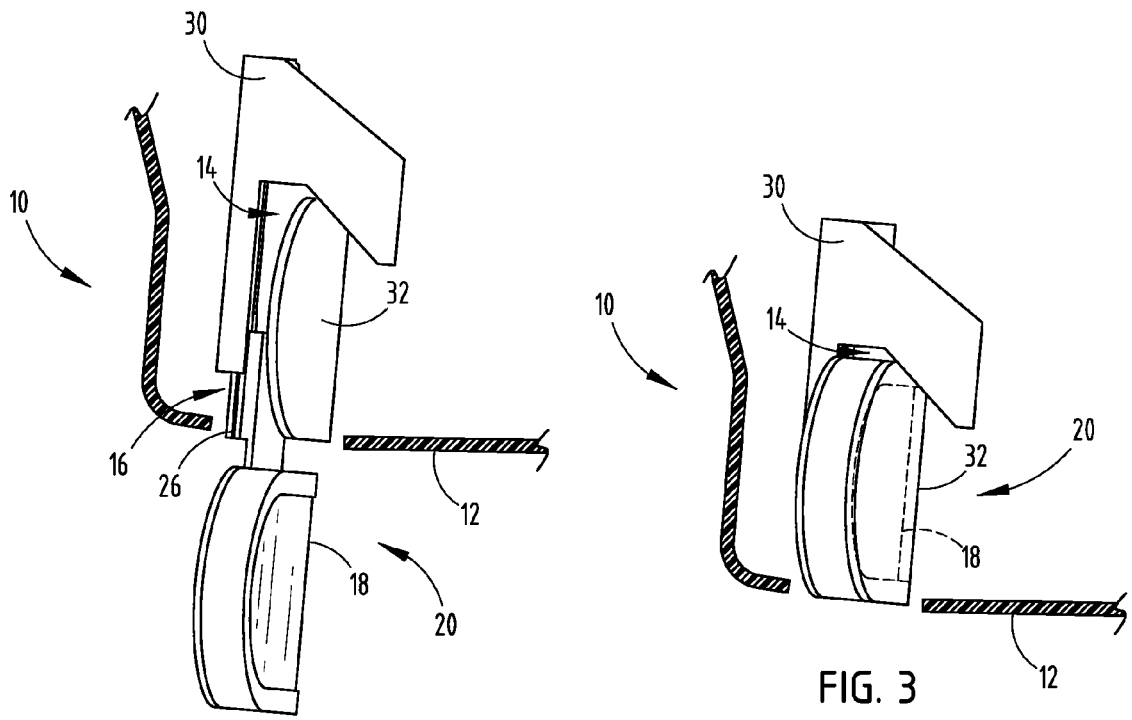
FIG. 2
FIG. 3

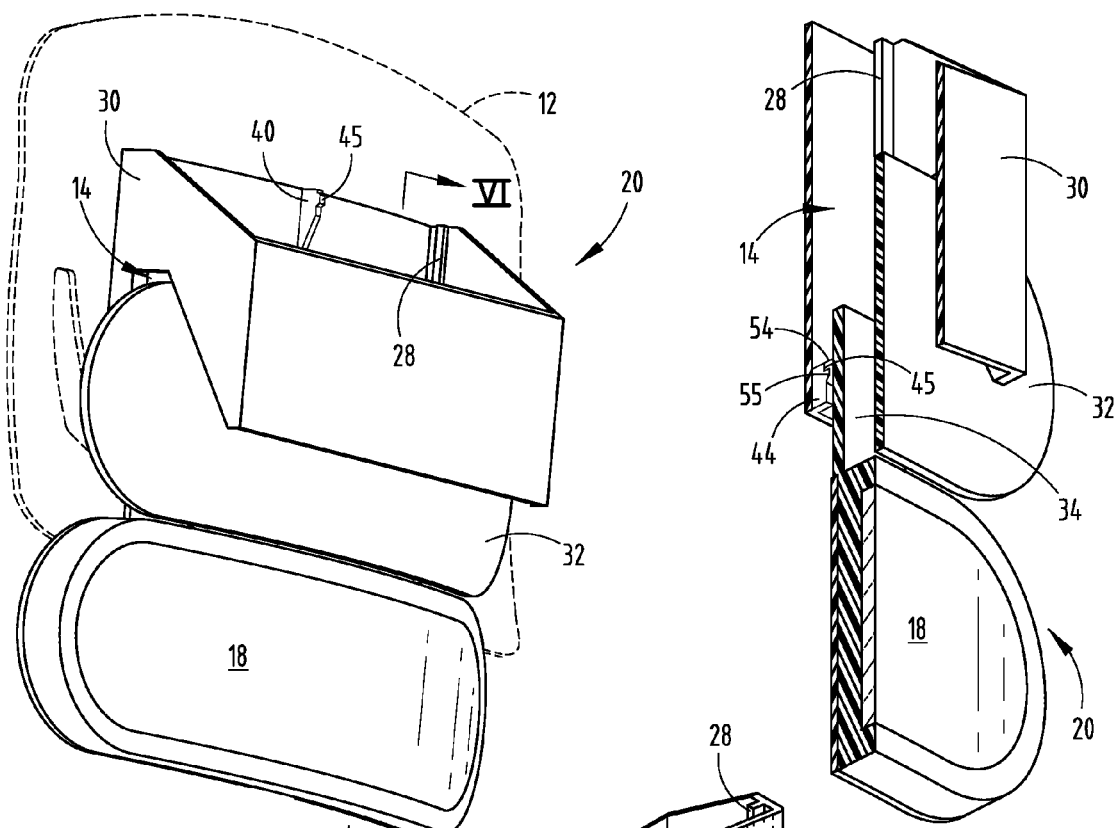
FIG. 5
FIG. 6
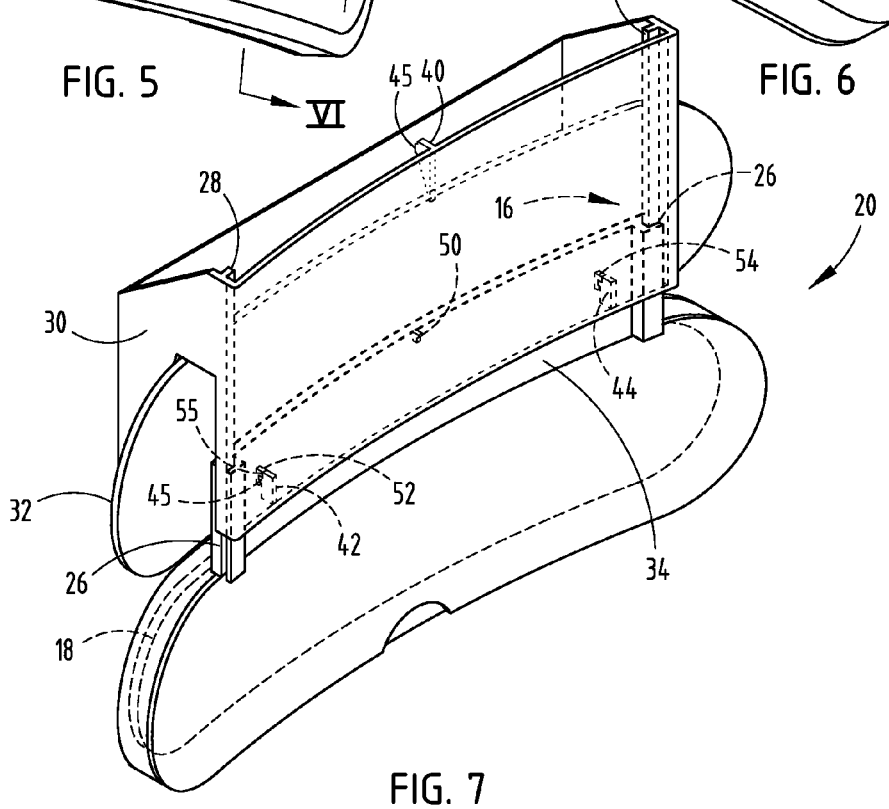
FIG. 7

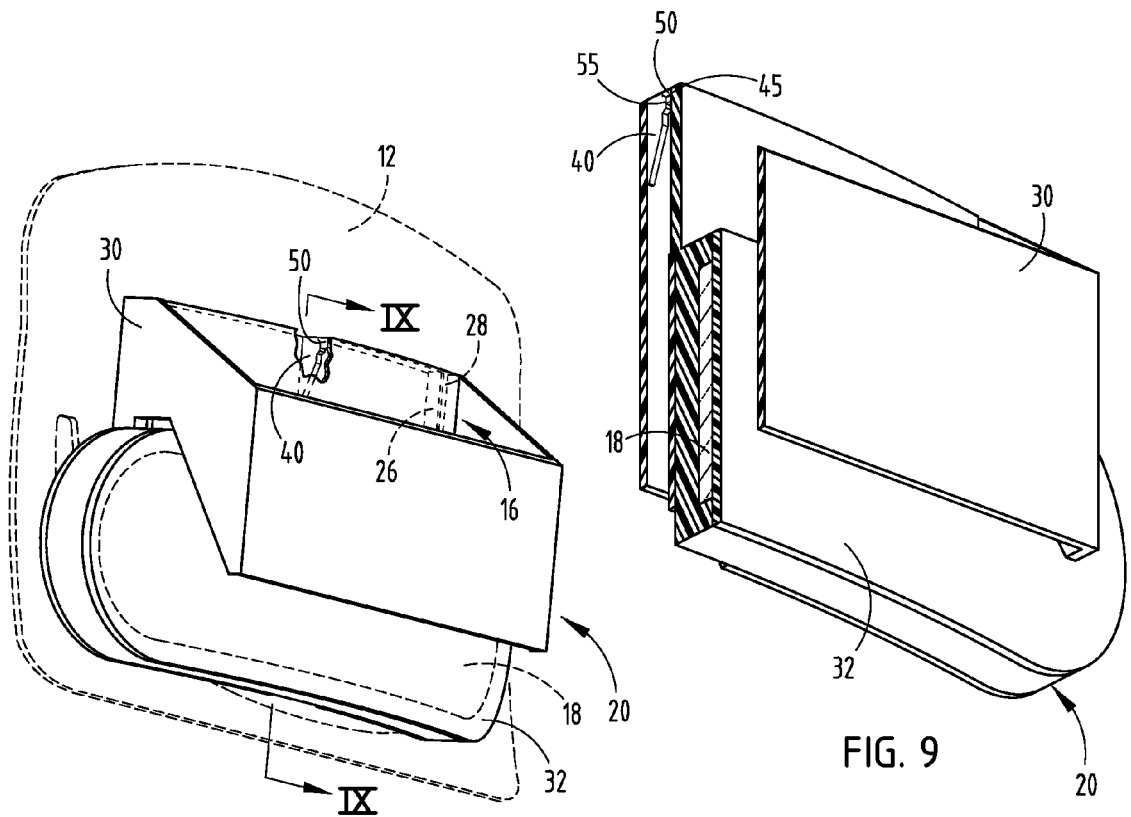
FIG. 8
FIG. 9
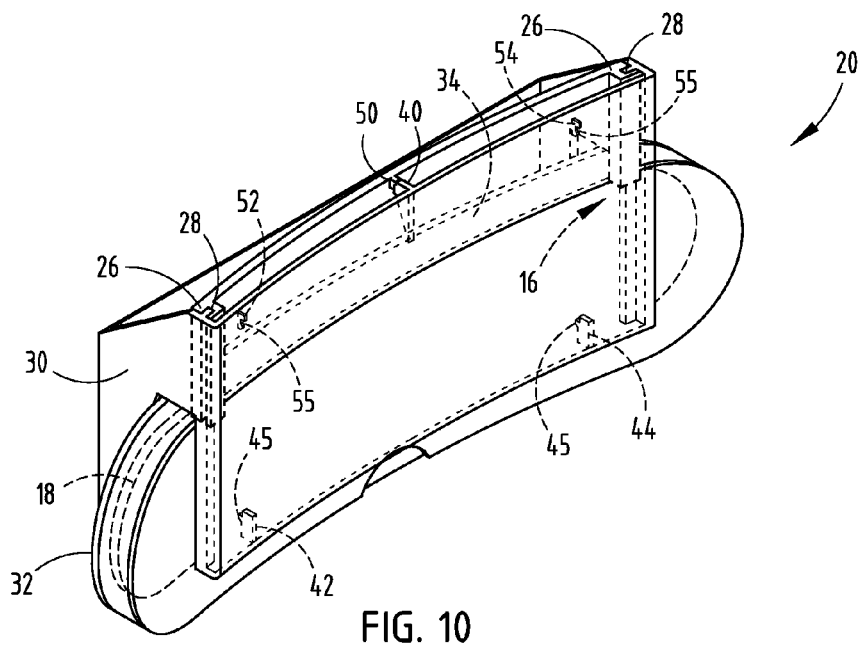
FIG. 10

US 9,446,714 B2

SLIDING CONVERSATION MIRROR ASSEMBLY WITH FRICTION TABS FOR VEHICLE OVERHEAD CONSOLE

FIELD OF THE INVENTION

The present invention generally relates to vehicle overhead consoles, and more particularly relates to a vehicle overhead console equipped with a conversation mirror.

BACKGROUND OF THE INVENTION

Automotive vehicles are commonly equipped with a rearview mirror that enables drivers view the road behind the vehicle. While rearview mirrors are typically positioned to provide a view of roadside conditions behind the vehicle, there may exist instances where a driver desires to view the back seat portion of the vehicle such as checking on young children or engaging occupants sitting in the rear seating area of the passenger compartment. In these scenarios, a driver must either reposition the rearview mirror or turn around, both of which may create an unsafe driving condition. For these and other types of vehicle use scenarios, it may be desirable to provide a conversation mirror that provides a view of the backseat area without obstructing the rearview mirror.

SUMMARY OF THE INVENTION

According to one aspect of the present invention, a vehicle conversation mirror assembly is provided that includes a housing defining a storage space and a conversation mirror. The vehicle conversation mirror also includes a slider mechanism operably coupled to the conversation mirror to move the conversation mirror between a stored position within the storage space and a use position extending from the housing. The vehicle conversation mirror further includes a tab arrangement in communication with the slider mechanism to releasably secure the conversation mirror to one of the stored and use positions.

According to another aspect of the present invention, a vehicle overhead console is provided that includes a housing defining a storage space in the overhead console. The vehicle overhead console also includes a slider mechanism and a conversation mirror operably coupled to the slider mechanism to move between a stored position within the storage space and a use position extending from the housing. The overhead console further includes a tab arrangement in communication with the slider mechanism to releasably secure the conversation mirror to one of the stored and use positions These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a is a perspective view of a vehicle passenger compartment having an overhead console employing a vehicle conversation mirror assembly;

FIG. 2 is a side view of the conversation mirror assembly showing the conversation mirror in a downward deployed use position;

FIG. 3 is a side view of the conversation mirror assembly showing the conversation mirror in the upward stowed position;

FIG. 5 is a front perspective view of the conversation mirror assembly of FIG. 4 showing the conversation mirror in the downward deployed use position;

FIG. 6 is a cross-sectional view taken through line VI-VI of FIG. 5 showing frictional tab engagement in the downward deployed use position;

FIG. 7 is a rear perspective view of the conversation mirror assembly of FIG. 4 shown in the downward deployed use position;

FIG. 8 is a front perspective view of the conversation mirror assembly of FIG. 4 showing the conversation mirror in the upward stowed position;

FIG. 9 is a cross-sectional view taken through line IX-IX of FIG. 8 showing frictional tab engagement;

FIG. 10 is a rear perspective view of the conversation mirror assembly of FIG. 4 showing the conversation mirror in the upward stowed position;

DETAILED DESCRIPTION OF THE PREFERRED EMBODIMENTS

Figure 4:
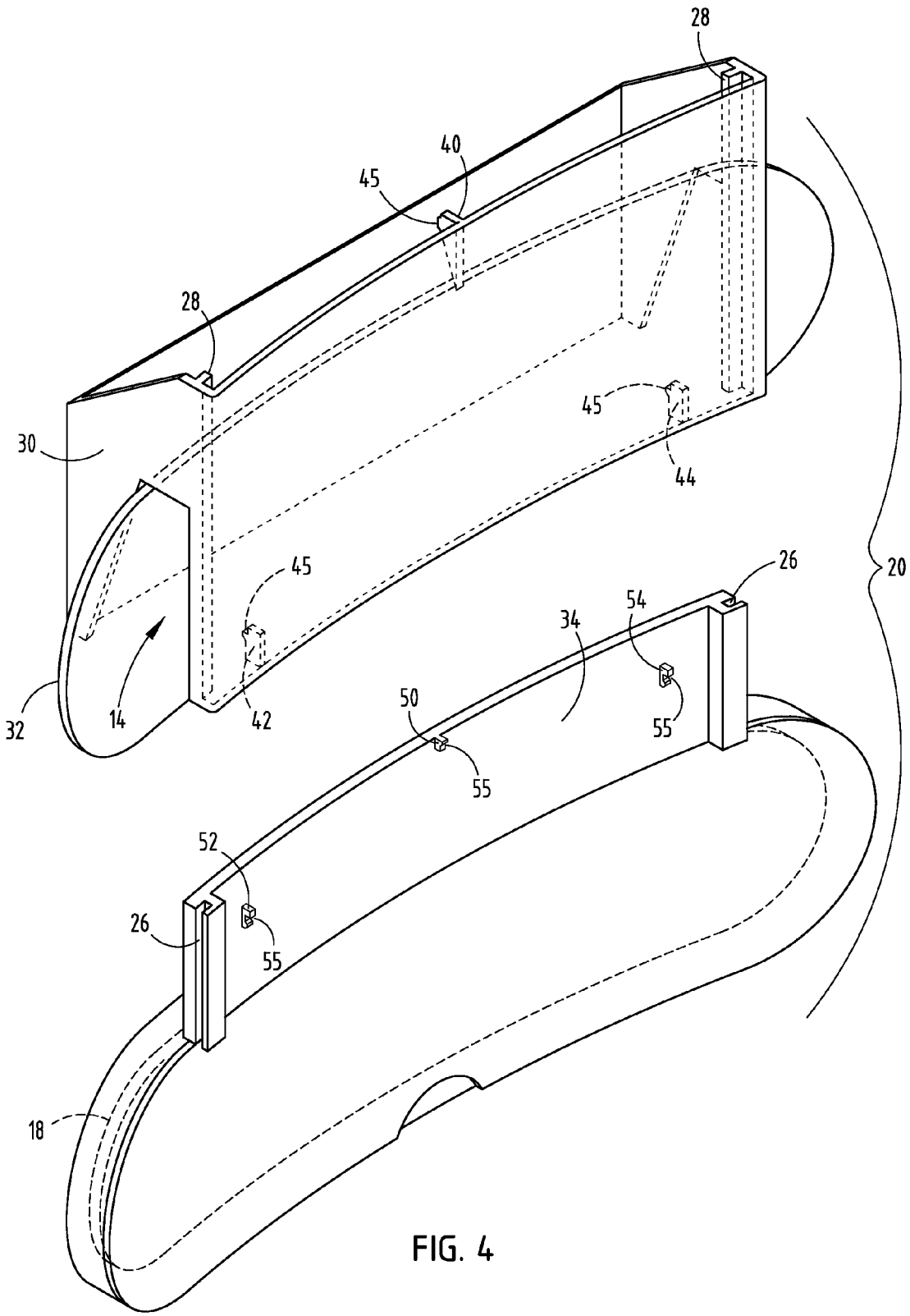
FIG. 4 is an exploded view of the conversation mirror assembly employing friction tabs, according to one embodiment.

Referring now to FIG. 1, the passenger compartment of an automotive vehicle 2 is generally illustrated having a vehicle overhead console 10 generally located on the front portion of the interior roof 4 between the driver and front passenger seats. The overhead console 10 is generally rearward of and above the conventional interior rearview mirror 6 so as not to interfere with viewing of the rearview mirror 6. The overhead console 10 may be connected to the underside of a vehicle headliner or roof 4 and may include various components such as one or more storage compartments, light assemblies, user input switches, and other vehicle assemblies. The overhead console 10 is equipped with a conversation mirror assembly 20 that includes a conversation mirror 18 that may be stowed in a stowed position within the overhead console 10 and deployed to a use position extending vertically downward below the overhead console 10 to allow a driver or front seat passenger to view the area rearward of the front seat in the passenger compartment such as the rear seating area.

Referring to FIGS. 2 and 3, the overhead console 10 includes a housing 12 which defines a storage space 14 and is located to provide generally unobstructed view of the rearview mirror. The storage space 14 contains a slider mechanism 16 capable of moving the conversation mirror 18 between an upward stowed position as shown in FIG. 3 and a downward use position with respect to the opening of the storage space 14 as shown in FIG. 2. The conversation mirror 18 is operatively connected or secured to the slider mechanism 16 to allow the conversation mirror 18 to move between the upward stowed position and downward use position. A passenger, such as the driver of the vehicle is able to view the back seat portion of the vehicle when the slider mechanism 16 and conversation mirror 18 are deployed in the downward use position. A user may manually actuate the conversation mirror 18 upward to the stowed position by applying upward force and may deploy the conversation mirror downward to the use position by applying downward force. To transition between the stowed and use positions, the vehicle conversation mirror 18 employs the slider mechanism 16 and further employs a coupling arrangement to hold the conversation mirror 18 in the stowed and use positions.

The conversation mirror 18 has a reflective or mirrored surface that provides a wide viewing angle such as to enable a person seated in a front seat to view of the back seating area of the vehicle. According to one embodiment, the conversation mirror 18 has a curved convex shape. The conversation mirror 18 is shown having an elongated length and a relatively smaller height to as to prevent interference of the conventional interior rearview mirror 16 for viewing of objects rearward of the vehicle. It should be appreciated that the conversation mirror 18 may have other shapes and sizes, according to other embodiments.

Referring to FIGS. 4-10, the coupling arrangement is shown in one embodiment employing a tab arrangement that releasably secures the sliding mechanism 16 and the conversation mirror 18 in either the use position or the stowed position. The conversation mirror assembly 20 includes a housing member 30 fixedly connected to or formed as part of the housing 12 and defining a storage space 14 for receiving the conversation mirror 18 in the stowed position. The housing member 30 includes a pair of male members 28 each adapted to slideably engage a slot formed by a pair of vertical extending rails 26. The male members 28 may each include a vertical extending bar or one or more pins. The conversation mirror assembly 20 further includes a slider mechanism 16 operatively coupled to the conversation mirror 18. The slider mechanism 16 includes the two pairs of rails 26 configured to receive members 28 and allows the conversation mirror 18 to be guided between the upward stowed position and the downward use position. The slider mechanism 16 includes a bracket 34 that may extend on the rear side of the conversation mirror 18 and extend thereabove with the two pairs of rails 26 extending above the conversation mirror 18. As such, the slider mechanism 16 attaches to the conversation mirror 18 via the bracket 34. In such an arrangement, the slider mechanism 16 extends vertical into the storage space 14.

The tab arrangement includes a plurality of friction engaging tabs, such as snap tabs, that frictionally engage one another to hold the conversation mirror 18 in one of the upward stowed position and downward use position. The tabs include a first plurality of tabs 40, 42 and 44 shown provided on the housing member 30 and extending inward into storage space 14. Tab 40 is located near the top of the housing member 30 central between lateral sides and tabs 42 and 44 are located near the bottom of housing 30 near opposite sides. The plurality of tabs further includes a second plurality of tabs 50, 52 and 54 provided on the bracket 34 of slider mechanism 16. Certain of the first plurality of tabs 40, 42 and 44 are arranged to interface with and frictionally engage certain of the second plurality of tabs 50, 52 and 54 to hold the conversation mirror 18 in one of the use and stowed positions.

Additionally, the conversation mirror assembly 20 includes a protective cover 32 disposed within storage space 14. The cover 32 shown formed as a curved sheet acts as a protective cover when the conversation mirror 18 is positioned in the upward stowed position such that the conversation mirror 18 is located rearward of cover 32.

With particular reference to FIGS. 5-7, the conversation mirror 18 is shown in the downward deployed use position in which the conversation mirror 18 extends below the overhead console and allows for the vehicle driver or passenger in the front seat to view an area rearward of the front seat within the passenger compartment. In the downward position, tabs 52 and 54 on the bracket 34 frictionally engage tabs 42 and 44, respectively, on the inside of the housing member 30. The frictional engagement of the matingly engaged tabs 42, 44, 52 and 54 holds the conversation mirror 18 in place relative to the housing member 30 sufficient to hold the conversation mirror 18 in the use position despite dynamic forces experienced on the vehicle. The frictional engagement of the matingly engaged tabs may be achieved by a snap-fit arrangement. For each pair of matingly engaged pairs of tabs, one tab may have a tooth 45 that engages a depression or notch 55 in the other of the engaged pairs of tabs. Other frictional mating engageable shapes and sizes of tabs may be employed to hold the conversation mirror 18 is the use and stowed positions. The frictional engagement of the matingly engaged tabs may be overcome by a force whereby a user may disengage the matingly engaged tabs to allow the conversation mirror to slide vertically up from the downward deployed use position.

With particular reference to FIGS. 8-10, the sliding conversation mirror assembly 20 is shown with the conversation mirror 18 in the upward stowed position. The conversation mirror 18 is moved upward by a user applying force vertically upward to allow the bracket 34 of slider mechanism 16 to slide on its two pairs of rails 26 which engage members 28 until the frictional tab 50 on bracket 34 frictionally engages tab 40 on housing member 30 so as to lock the sliding members into frictional engagement to hold conversation mirror 18 in the upward stowed position. The frictional engagement of tabs 40 and 50 is sufficient to prevent the conversation mirror 18 from dropping downward due to gravity or dynamic forces that are normally experienced with the vehicle. Tabs 40 and 50 may likewise be configured with one tab having a tooth 45 that engages a depression or notch 55 in the other tab. The frictional engagement between tabs 40 and 50 may be overcome by a force whereby a user may disengage the mating engagement of the tabs by pulling the conversation mirror 18 downward with a sufficient force to overcome the frictional engagement. The tab may be made of a polymeric material that flexes to allow movement between matingly engaged tabs such that the tooth 45 may move into and out of engagement with the notch 55.

Furthermore, release and return mechanisms may be used to dislodge the slider mechanism 34 and conversation mirror 18 from the stored and use positions. A release mechanism may include a leverage device to leverage the slider mechanism out of frictional engagement with the housing member. Such mechanisms may include electrical activated and manual activated mechanism and may employ a spring to bias the slide mechanism.

Figure 11:
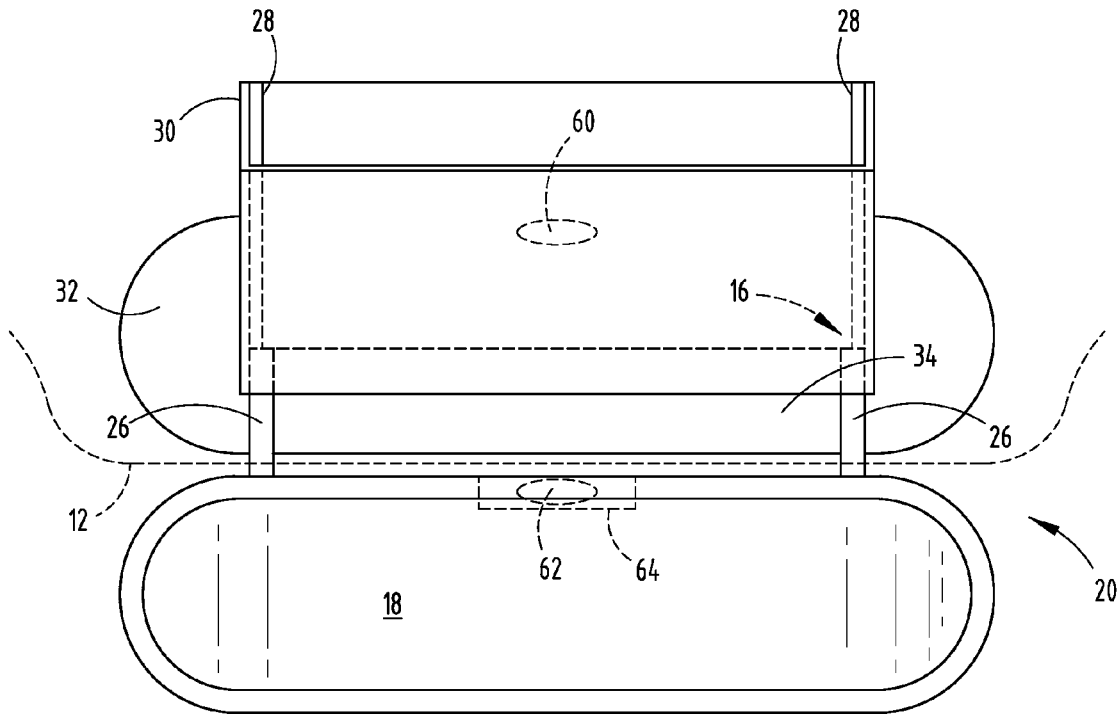
FIG. 11 is a front view of a conversation mirror assembly employing a magnetic arrangement according to another embodiment with the conversation mirror in the downward deployed use position.
Figure 12:
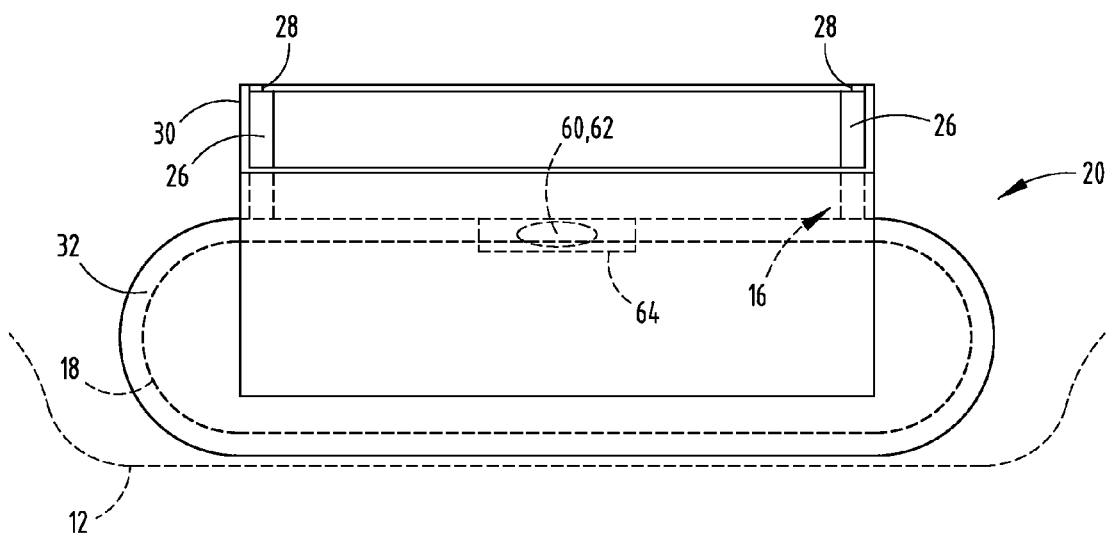
FIG. 12 is a front view of the conversation mirror assembly shown in FIG. 11 with the conversation mirror shown in the upward stowed position.

Referring to FIGS. 11 and 12, a second embodiment of a coupling arrangement in the form of a magnetic arrangement is shown for positioning the conversation mirror 18 in the stowed and use positions. In this embodiment, a slider mechanism 16 with bracket 34 operatively coupled to conversation mirror 18 two pairs of vertically extending rails 26 matingly engaging male members 28 in housing member 30 may be employed as described in with connection with the assembly of FIG. 4 to allow the conversation mirror 18 to slide vertically upward and downward between stowed and use positions. In this embodiment, the coupling arrangement employs magnetic attraction to hold the conversation mirror 18 in one of the upward stowed position and downward use position. The magnetic arrangement is employed to attract and secure the slider mechanism 34 and conversation mirror 18 to the upward stowed position within the storage space 14 and the use position extending downward from the housing member 30. The magnetic arrangement includes a first magnetic portion 60 operatively coupled to the housing member 30 near the top thereof and a second magnetic portion 62 operatively coupled to the housing member 30 near a bottom side thereof, according to one embodiment. In one embodiment, a ferrous member 64 is operatively coupled to the conversation mirror 18 and is magnetically attracted to the magnetic portions 60, 62. The magnetic portions may each include one or more magnets that attract to a ferrous material. The ferrous member 64 may be located on the bracket 34 or on the conversation mirror 18. The ferrous member 64 is disposed to magnetically attract to one of the first and second magnetic portions 60 and 62. When the conversation mirror 18 is moved to the upward stowed position, the ferrous member 64 attracts to magnetic portion 60 to hold the conversation mirror 18 in the upward stowed position during normal vehicle motion. The magnetic attraction between the magnetic portion 60 and ferrous material 64 may be overcome a user applying sufficient force to pull the conversation mirror 18 downward to the use position. In the use position, the magnetic portion 62 attracts to the ferrous portion 64 to hold the conversation mirror 18 in the downward use position during normal vehicle motion. The magnetic attraction between magnetic portion 62 and ferrous member 64 may be overcome by a user applying sufficient force to push the conversation mirror 18 vertically upward to its stowed position. The magnetic attraction is sufficient to hold the conversation mirror 18 in the use or stowed positions despite forces experienced during normal operation of the vehicle. While the magnetic portions 60 and 62 are shown and described as provided on the housing member 30 and the ferrous member is provided on the conversation mirror 18, it should be appreciated that the magnetic portions 60 and 62 may be provided on the conversation mirror 18 or bracket 34 and that the ferrous member 64 may be provided on the housing member 30.

The magnetic portions 60 and 62 may include magnets that attract to a ferrous material. Each magnet may include a single magnet or a plurality of magnets. The ferrous member 64 may be provided on the back surface of the conversation mirror 18 or may be provided on a member of the slider mechanism 16, such as the bracket 34 which, in turn, is coupled to the conversation mirror 18. By employing the attraction force between the magnets and the ferrous material, a smooth movement of the bracket 34 and the conversation mirror 18 is achieved relative to the housing 20, without requiring a latch mechanism.

In one embodiment, the slider mechanism 16 includes two pairs of rails 26 each for engaging a male member 28 such as a bar or one or more pins to allow the bracket to matingly slide relative to the housing. According to other embodiments, other pins or connectors or matingly engaging sliding mechanisms may be employed to allow the conversation mirror 18 to move vertically between the downward use position and the upward stowed position. It should further be appreciated that a release and return mechanism may be employed to dislodge the bracket 34 and conversation mirror 18 from the stowed and use positions. Such mechanism may include electrical and manual means.

Figure 13:
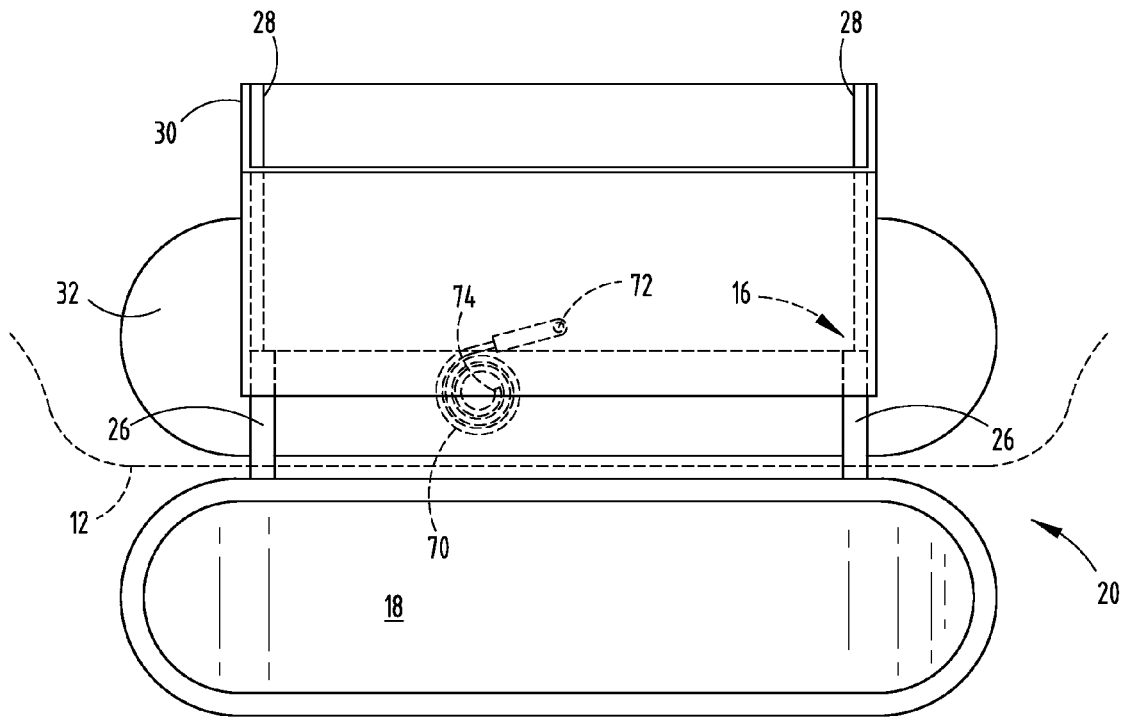
FIG. 13 is a front view of a conversation mirror assembly employing a spring arrangement according to a further embodiment with the conversation mirror shown in the downward deployed use position.
Figure 14:
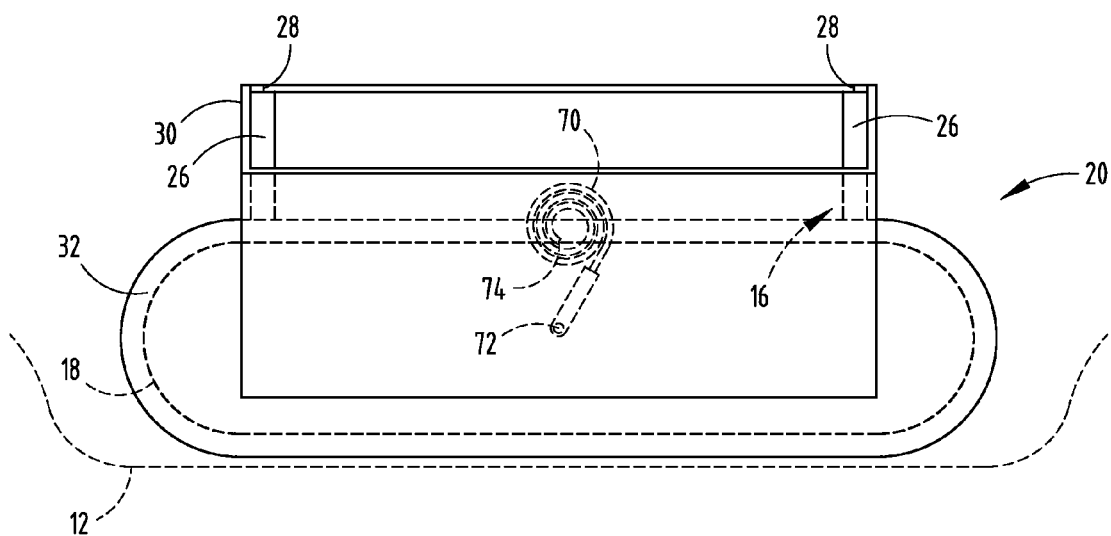
FIG. 14 is a front view of the conversation mirror of FIG. 13 showing the conversation mirror in the upward stowed position.

Referring to FIGS. 13 and 14, a third general embodiment of the conversation mirror assembly 20 is shown having a spring arrangement that releasably secures the slider mechanism 16 and conversation mirror 18 in the use and stowed positions. There exist many types of spring arrangements suitable for the abovementioned application, which may include compression, extension, and torsion spring types. In the instant embodiment, the spring arrangement includes a torsion spring 70 operably coupled to the housing member 30 at end 72 and to the bracket 34 at end 74, wherein moving the bracket 34 and conversation mirror 18 to the stowed position stores rotational energy in the spring's windings that are released once the conversation mirror 18 moves to the use position. The spring 70 may include an over center spring that bias the conversation mirror 18 to one of the upward stowed position and downward use position. In doing so, the slider mechanism 16 slides on the pairs of rails 26 and male guide members 28 as described above. Once the slider mechanism 16 crosses over center, the spring 70 biases the bracket 34 and conversation mirror 18 to one of the upward stowed position and downward use position.

Movement between the use and stowed positions may be facilitated by any of the means described in previous embodiments in addition to other suitable means not described herein. Similar to previous embodiments, a release and return mechanism may be used to dislodge the conversation mirror 18 from the stowed and use positions, which may include electrical and manual means.

It is to be understood that variations and modifications can be made on the aforementioned structures without departing from the concepts of the present invention, and further it is to be understood that such concepts are intended to be covered by the following claims unless these claims by their language expressly state otherwise.

We claim:

1. A conversation mirror assembly comprising:
   a housing provided in an overhead console and defining a storage space having male members therein;
   a slider mechanism movable between a stowed position within the storage space and a use position extending from the housing, and comprising:
   a conversation mirror; and
   slotted rails for slideably engaging the male members; and
   a tab arrangement to releasably secure the conversation mirror to one of the stowed and use positions.

2. The conversation mirror assembly of claim 1, wherein the tab arrangement comprises a first pair of tabs disposed inside the storage space and a second pair of tabs coupled to the slider mechanism, wherein the first pair of tabs is configured to matingly engage the second pair of tabs to secure the slider mechanism in the use position.

3. The conversation mirror assembly of claim 2, wherein the first pair of tabs are provided at a lower portion of the housing and the second pair of tabs are provided at an intermediate portion of the slider mechanism.

4. The conversation mirror assembly of claim 1, wherein the tab arrangement comprises a first tab disposed inside the storage space and a second tab coupled to the slider mechanism, wherein the first tab is configured to matingly engage the second tab to secure the slider mechanism in the stowed position.

5. The conversation mirror assembly of claim 4, wherein the first tab is provided at a central upper portion of the housing and the second tab is provided at a central upper portion of the slider mechanism.

6. The conversation mirror assembly of claim 1, wherein the male members extend vertically within the storage space, and wherein the slider mechanism moves vertically within the storage space to extend the conversation mirror downward within a passenger compartment of the vehicle.

7. The conversation mirror assembly of claim 6, wherein the male members comprise a pair of bars that are oppositely disposed inside the storage space and are each configured to slideably engage a corresponding slotted rail of the slider mechanism.

8. The conversation mirror assembly of claim 1, wherein the conversation mirror is separate and distinct from a rearview mirror and is positioned forward of the rearview mirror when the conversation mirror is viewed from a passenger seated in a passenger compartment.

9. The conversation mirror assembly of claim 1, further comprising a protective cover separate from the housing and disposed within the storage space, wherein the protective cover is shaped to cover the conversation mirror when the slider mechanism is in the stowed position.

10. A conversation mirror assembly comprising:
a housing provided in an overhead console and defining a storage space having vertically extending male members therein;
a slider mechanism movable between a stowed position within the storage space and a use position extending from the housing, and comprising:
a conversation mirror; and
slotted rails for slideably engaging the male members; and
a tab arrangement to releasably secure the conversation mirror to one of the stowed and use positions.

11. The conversation mirror assembly of claim 10, wherein the tab arrangement comprises a first pair of tabs disposed inside the storage space and a second pair of tabs coupled to the slider mechanism, wherein the first pair of tabs is configured to matingly engage the second pair of tabs to secure the slider mechanism in the use position.

12. The conversation mirror assembly of claim 11, wherein the first pair of tabs are provided at a lower portion of the housing and the second pair of tabs are provided at an intermediate portion of the slider mechanism.

13. The conversation mirror assembly of claim 10, wherein the tab arrangement comprises a first tab disposed inside the storage space and a second tab coupled to the slider mechanism, wherein the first tab is configured to matingly engage the second tab to secure the slider mechanism in the stowed position.

14. The conversation mirror assembly of claim 13, wherein the first tab is provided at a central upper portion of the housing and the second tab is provided at a central upper portion of the slider mechanism.

15. The conversation mirror assembly of claim 10, wherein the male members comprise a pair of bars that are oppositely disposed inside the storage space and are each configured to slideably engage a corresponding slotted rail of the slider mechanism.

16. The conversation mirror assembly of claim 10, wherein the conversation mirror is separate and distinct from a rearview mirror and is positioned forward of the rearview mirror when the conversation mirror is viewed from a passenger seated in a passenger compartment.

17. The conversation mirror assembly of claim 10, further comprising a protective cover separate from the housing and disposed within the storage space, wherein the protective cover is shaped to cover the conversation mirror when the slider mechanism is in the stowed position.

18. A conversation mirror assembly comprising:
a housing provided in an overhead console and defining a storage space having vertically extending male members therein;
a slider mechanism movable between a stowed position within the storage space and a use position extending from the housing, and comprising:
a conversation mirror; and
slotted rails for slideably engaging the male members; and
a tab arrangement comprising:
a first pair of tabs disposed inside the storage space and provided at a lower portion of the housing;
a second pair of tabs provided at an intermediate portion of the slider mechanism;
wherein the first pair of tabs is configured to matingly engage the second pair of tabs to secure the slider mechanism in the use position;
a first tab disposed inside the storage space and provided at a central upper portion of the housing; and
a second tab coupled to the slider mechanism and provided at a central upper portion of the slider mechanism;
wherein the first tab is configured to matingly engage the second tab to secure the slider mechanism in the stowed position.

19. The vehicle overhead console of claim 18, wherein the male members comprise a pair of bars that are oppositely disposed inside the storage space and are each configured to slideably engage a corresponding slotted rail of the slider mechanism.

20. The vehicle overhead console of claim 18, wherein the conversation mirror is separate and distinct from a rearview mirror and is positioned forward of the rearview mirror when the conversation mirror is viewed from a passenger seated in a passenger compartment.

21. The vehicle overhead console of claim 18, further comprising a protective cover separate from the housing and disposed within the storage space, wherein the protective cover is shaped to cover the conversation mirror when the slider mechanism is in the stowed position.

* * * * *